Sept. 16, 1969 F. ULRICH 3,467,785

ROUTE SEARCHING GUIDE WIRE NETWORKS

Filed Oct. 19, 1965 3 Sheets-Sheet 1

Sept. 16, 1969 F. ULRICH 3,467,785

ROUTE SEARCHING GUIDE WIRE NETWORKS

Filed Oct. 19, 1965 3 Sheets-Sheet 3

3,467,785

ROUTE SEARCHING GUIDE WIRE NETWORKS

Friedrich Ulrich, Stuttgart-Weilimdorf, Germany, assignor to International Standard Electric Corporation Filed Oct. 19, 1965, Ser. No. 497,800
Claims priority, application Germany, Oct. 23, 1964, St 22,847
Int. Cl. H04m *3/16*
U.S. Cl. 179—18 3 Claims

ABSTRACT OF THE DISCLOSURE

A switching network negatively simulated by a guide wire network. If a portion of the line is seized or available in the switching network, the contact in the guide wire network is opened or closed respectively. Means are provided for checking on current passage in the guide wire network to determine whether a connection can be established. After the checking, magnetic circuits are used to select one of several possible connecting routes.

The invention relates to route searching guide wire networks or line searching networks in multi-stage telecommunication systems, particularly telephone exchange systems. The guide wire network is combined with magnetic selecting circuits to select an idle connecting path. In telephone exchanges with multiple switching grids a combined selection across all switching stages is desirable.

The problem is to find and select a combination of still available routes or lines through which a connection can be established between a selected input and a desired output, if such a combination is available. This problem can in principle be solved in one single step with the aid of a translator. When the translator input information consists of the request to establish a connection and the present idle or seized condition of the switching network, the translator can furnish as output information the identity of the partial routes to be interconnected. For switching networks as they are practically used this would be possible only with translators having extremely high capacities.

A successive, direct investigation of all available routes is impossible due to the characteristic of the partial input information concerning the condition of the switching network, because the final part of said information influences the entire output information. Similarly, a successive, indirect investigation statistically requires a large number of steps, because it is likely that all connecting routes, starting from the input, including those not leading to a called subscriber must be scanned, before a still available through-going connection can be identified or before it can be determined that no possibility of a connection exists any more.

Accordingly, it is an object of this invention to use the "guide wire system" of scanning to determine in one step, whether a connection is possible or not.

More particularly, it is an object of this invention to use a guide wire network that represents the "negative" of the switching network in its actual condition of seizure.

The well known guide wire network is similar to an analog computer in its mode of operation. An analog computer can handle only one problem at a time, but such a computer is very effective. The adaptation to the respective problem (connection to be established and seizing condition of the switching network) is accomplished in the guide wire method through the use of very simple through switches, inserted into the guide wire network, and controlled by elements in the switching network.

In the guide wire systems known to the art the busy links are simulated by operated switches, for example, and the total selection is carried out in several steps. In a first step, all route portions are marked which may be taken into consideration. In the following steps, individually marked portions are selected, seized and connected with previously selected and seized route portions. The conjugation is thus made with the aid of the markings step by step. The total expenditure (various independent selecting circuits, control facilities, signal devices etc.) is still rather extensive.

It is an object of the present invention in contrast to the above described methods known to the art, to enable a selection in which two or several connecting routes can be considered for final selection up to the final step of total selection. No selection and seizing of advancing partial sections is necessary. Thus, the inventive system enables the range of possible connections, composed of partial sections to be narrowed down with the aid of a final step, the definite selection is made.

In accordance with the present invention, route searching systems, particularly useful in telephone exchange systems, are characterized in this that the seized condition of the switching network is simulated by the condition of a guide wire network in the negative, that is, busy links are simulated by open, unoperated switches. The switching network is tested using the guide wire network, to determine whether a desired connection can be established. One of several possible connecting routes is selected in a single selecting process reaching across all switching stages by means of magnetic elements which test the guide wires on current passage. The guide wire network represents a "negative" to the switching network in as far as the contacts, inserted in sequence of the guide wires are concerned. The contacts are opened, if the pertinent connecting portion in the switching network is seized, and the contacts are closed, if the pertinent portions in the switching network become available.

Checking whether a designated connection can be established is carried out with a pulse generator at the destination of the desired connection, checking pulses are applied to the guide wires associated to the desired output of the switching network. An indicator receives those checking pulses from the guide wire associated to the selected input to the switching network, only if one or several conductive guide wires through the guide wire network are still available. During the checking process only those guide wires are selected, in the intermeshed network of the guide wires, which have single-side passage to the selected input into the switching network and to the selected output of same. This selection of guide wires is achieved in the route searching network, according to the invention, in that decoupling diodes are arranged within the guide wire network which prevent the checking pulses from reaching the selected input on detours, arriving from the desired output when the detours cannot be through-connected within the switching network.

The above mentioned and other features of this invention and the manner of obtaining them will become more apparent, and the invention itself will be best understood by reference to the following description of an embodiment of the invention taken in conjunction with the accompanying drawings, in which.

Figure 1:
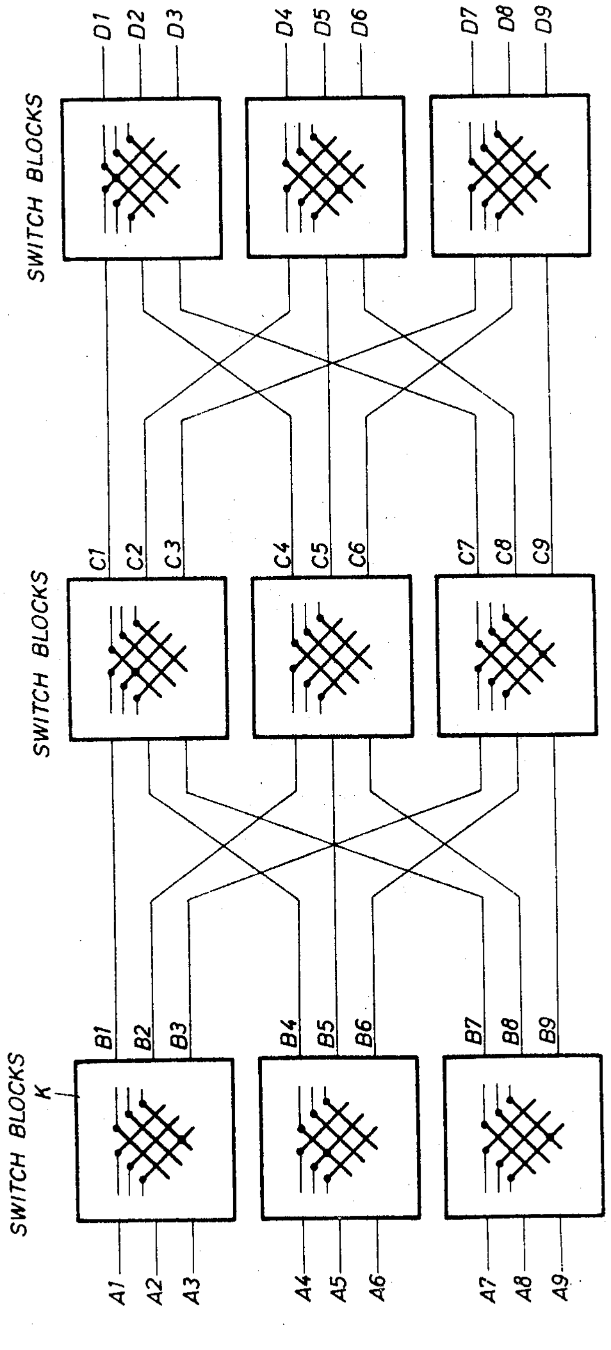
FIG. 1 shows in combined block and schematic form a simple example of a switching network.

As shown in FIG. 1, the inputs A1 to A9 can be connected with the outputs D1 to D9 in different ways via the switch blocks K, the intermediate lines B1 to B9 and C1 to C9. Each switch block can connect all inputs connected to it, e.g. A1 to A3 with all outputs connected to it e.g. B1 to B3, if the terminal lines are still available.

Figure 2:
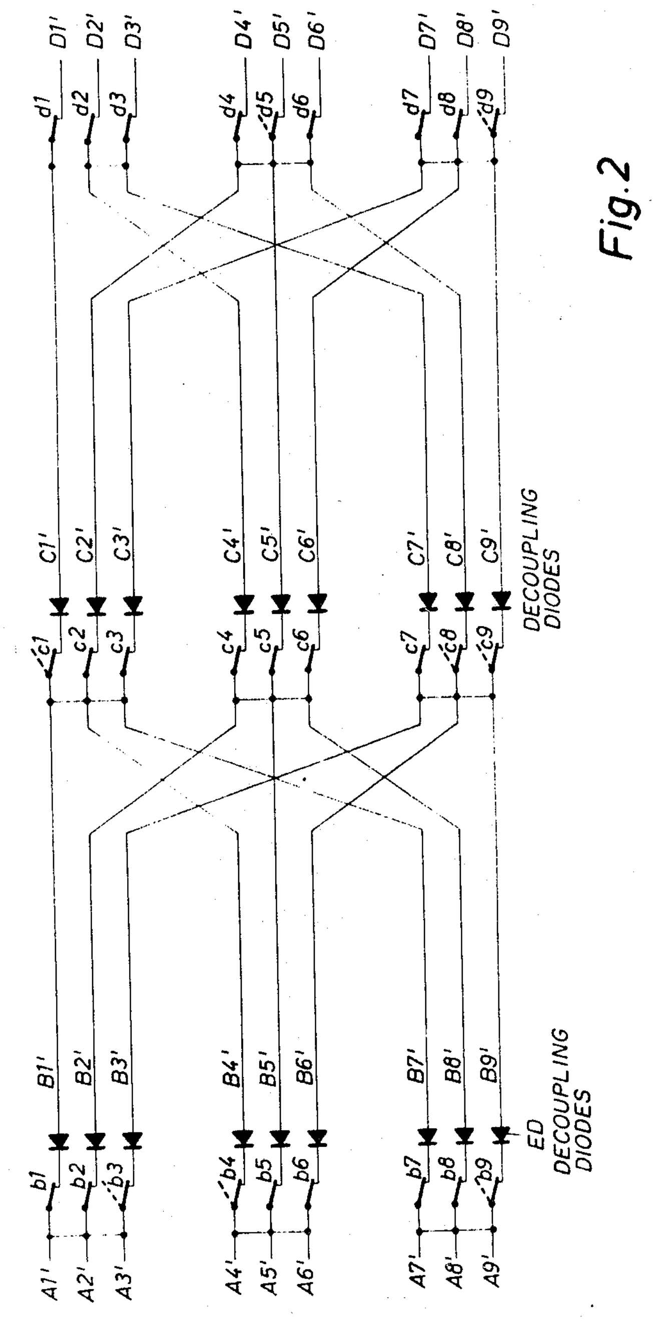
FIG. 2 shows a guide wire network designed like the switching network of FIG. 1.

As shown in FIG. 2 the guide wires associated to the inputs of the switch block, e.g. A1' to A3' are electrically interconnected. The guide wires, associated with the outputs of a switch block, e.g. B1' to B3' are connected via decoupling diodes ED. Said decoupling diodes prevent feedback via the guide wires interconnected at the input of the switch blocks. Between the common guide wire input and the decoupling diodes of the guide wire outputs a break-contact is inserted into the guide wires, e.g. *b*1 to *b*3. The break-contacts are actuated in any well known manner by setting elements in the switching network. If, for example, the intermediate line B2 is seized in the switching network the break-contact *b*2, associated to the guide wire B2', opens. The break-contacts, e.g. *b*1 to *b*3 in the guide wires, e.g. D1' to D3' of all lines, connected to the outputs of the switch blocks, but unseized, e.g. D1 to D3, are closed. In this way, the guide wire network represents at each instant the condition of the switching network. If a new connection between one input of the switching network and an output of said network shall be established, a current will flow through the guide wire representing all intermediate lines that can be used thereby several connections are possible of which one must be selected.

Different selecting circuits with magnetic elements are favorable for the route searching network.

For example, the route searching or selecting network can be designed so that for selecting one of several possible routes through the switching network, a selecting circuit with magnetic elements is provided into which the guide wires are threaded in a certain coded distribution. A guide wire through-connected from the input to the desired output is selected by a code-digit-like interrogation of the guide wires. When interrogating a code digit, all guide wire pieces which are excluded by previous interrogations from being selected are blocked by pulses applied via contradictorily looped magnetic elements. Such a selecting circuit is shown in the copending U.S. patent application entitled "Scanning and Selecting Systems" filed Oct. 15, 1965, Ser. No. 496,276 assigned to the assignee of this invention.

Another selecting circuit is equipped with magnetic elements into which the guide wire pieces are threaded in a coded, contradictory distribution. In a selecting step one of the possible guide wires is marked in compliance with a statistical selecting process, and that, via amplifying elements and via the code-digit-like, contradictorily looped magnetic elements all other guide wire pieces are blocked. In this circuit the selection must be initiated simultaneously for all switching stages, because only a temporary storage effect exists (switching periods of the magnetic elements). Such a selection system is disclosed in a co-pending application entitled "Selection Circuit" filed on Oct. 6, 1965 Ser. No. 493,448 and assigned to the assignee of this invention.

Figure 3:
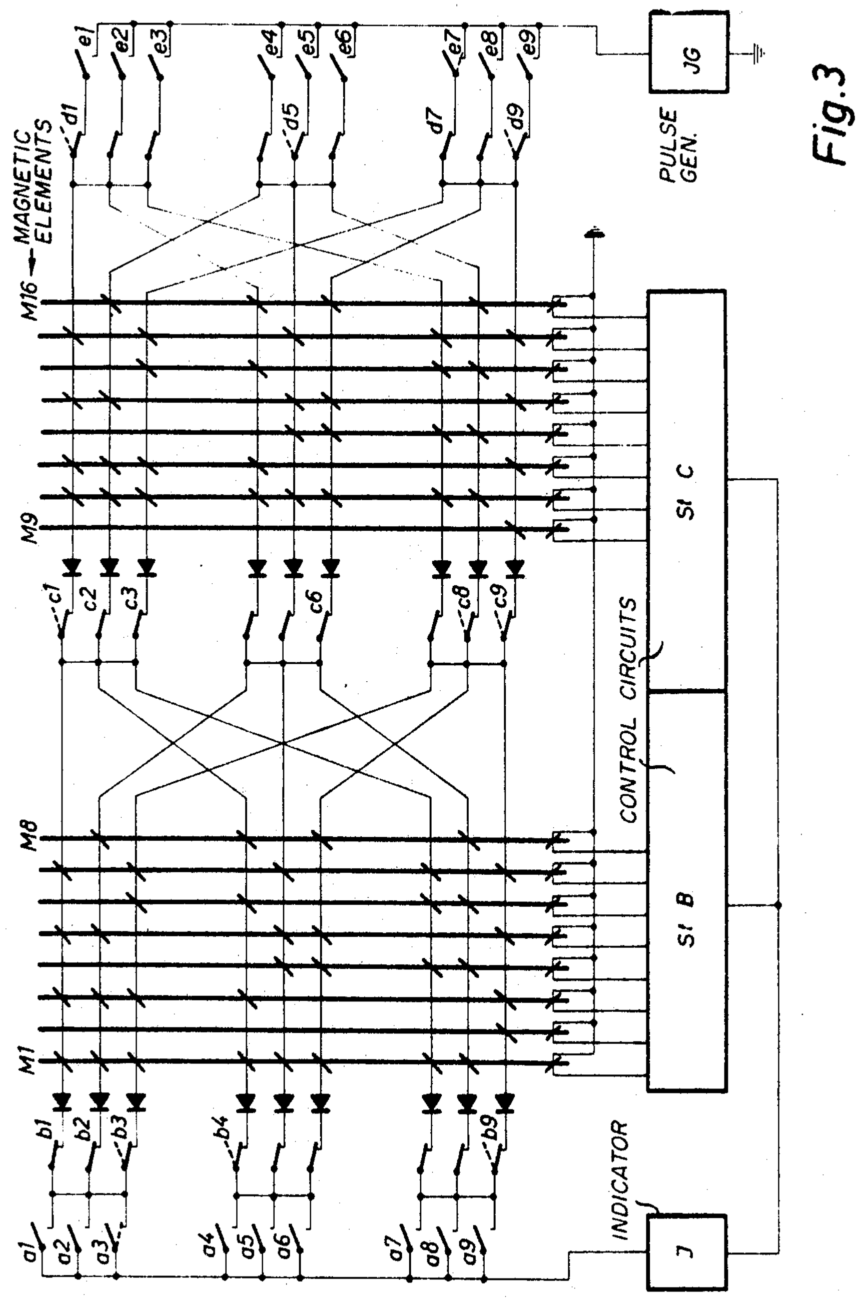
FIG. 3 shows a route searching network according to the invention for selecting routes in switching networks such as shown in FIG. 1.

The exemplary route searching network of this invention comprises a guide wire network, such as shown in FIG. 2, and the selecting facilities, additionally shown in FIG. 3. FIG. 3 shows, as example, a selecting circuit in which the guide wires to be interrogated are threaded in a binary-code distribution through two groups of magnetic elements M1 to M16. In the circuit of FIG. 3, a guide wire is selected by applying code digit pulses in successive interrogations of the magnetic elements on an offering to individually interrogate the threaded guide wires, and in which the guide wires not having been selected receive blocking pulses for the already interrogated magnetic elements. The offering marking consists in that all contacts inserted in a guide wire train are closed. Interrogation and blocking of the magnetic elements M1 to M16 are performed by the control circuits S*t*B, S*t*C.

It is possible to use for the selecting processes in all stages a common control circuit.

The position of the contacts, indicated by dotted lines in FIG. 3, represents the function of the route searching network at a defined seizing of the switching network. According to FIG. 1 as shown by the small circles at points of contact, the following connections are already established in the switching network:

(1) A1–B3–C8–D5,
(2) A5–B4–C1–D1,
(3) A9–B9–C9–D9.

In the guide wire network according to FIG. 2, the contacts *b*3, *b*4, *b*9, *c*1, *c*8, *c*9, *d*1, *d*5, and *d*9 are open, all other contacts, shown in FIG. 2 are closed. FIGS. 2 and 3 represent this condition of the guide wire network by the dotted lines of the contact positions.

In the condition of the switching network, a connection between input A3 and output D7 shall be established, for example. To this end the contacts *a*3 and *e*7 are closed in the route searching network, FIG. 3. Since other current paths through the guide wire network are available pulses of the pulse sender JG reach the indicator J through the following paths:

*e*7–D7'–*d*7–C3'–*c*3–B1'–*b*1–A3'–*a*3–, or:
*e*7–D7'–*d*7–C6'–*c*6–B2'–*b*2–A3'–*a*3, respectively. Thereupon the indicator starts the selecting facilities which select, according to the proposed method, one of the possible offered guide wires.

The selecting circuit, shown on the drawing operates with systematic interrogation, such as that disclosed in the copending application entitled "Scanning and Selecting Circuit" but also another selecting circuit with statistical selection can be used. In a systematically operating selecting circuit the control circuits S*t*B, S*t*C can be concentrated in the different switching stages. The magnetic elements are interrogated successively and the guide wire pieces of the already interrogated, but not selected guide wires receive blocking pulses when the following guide wire pieces are interrogated. Thus, the only guide wire pieces which are connected with the already selected guide wire pieces can be selected.

In an already proposed (the copending application entitled "Selecting Circuit") statistically operating selecting circuit the control circuits must be concentrated, selection in all switching stages must be carried out simultaneously, because the results of the partial piece selection are available for a limited time only (reversing period of the magnetic elements).

In any case, the result can be tapped in the control circuit, after the selection has been finished. From that point the through-connection in the switching network is then controlled. If the guide wire train

*a*3–A3–*b*1–B1'–*c*3–C3'–*d*7–D7'–E7 is selected, for example, the connections A3–B1, B1–C3, and C3–C7 are established in the switching network, thereupon the contacts *b*1, *c*3, and *a*7 open in the guide wire network and the contact *a*3 and *e*7 in the selecting facility are opened again. The route searching network according to the invention is now available to establish another connection.

While the principles of the invention have been described above in connection with specific apparatus and applications, it is to be understood that this description is made only by way of example and not as a limitation on the scope of the invention.

I claim:

1. A route searching network for use in multi-stage telecommunications for finding and selecting a route from a calling position to a called position through a switching network, said route searching network comprising:

a guide wire network, contact means in the guide wire network for simulating corresponding links in the switching network, said contact means being opened if the corresponding links of the switching network are seized, and being closed, if the corresponding links of the switching network are available, the guide wire network thereby negatively simulating the seized condition of the switching network, pulse generator means for applying pulses to the guide wire of the guide wire network corresponding to the called posi:ion of the switching network, indicator means for receiving the pulses on the guide wire corresponding to the calling position of the switching network, if at least one guide wire path in the guide wire network is available, indicating that at least one available connecting route through the switching network exists, and control circuit means including magnetic elements operated responsive to the receipt of the pulses by said indicator means for selecting a single path through said switching network.

2. The route searching network of claim 1 wherein said guide wire network includes decoupling diodes arranged to prevent the pulses from reaching the called position through paths which correspond to the seized links that cannot be through-connected in the switching network.

3. The route searching network of claim 2, including means whereby the control circuit with said magnetic elements are arranged with the guide wires threaded therethrough in a first direction in a coded distribution, interrogation means for successively applying interrogation pulses to said magnetic elements on a coded digital basis for individually interrogating each of said guide wires, whereby a guide wire through connected from the calling position to the desired called position is selected, and said interrogation means including blocking means comprising loop means threaded through said magnetic elemen's in a direction opposite to said first direction for excluding from the selection all guide wires except the selected guide wire.

References Cited

UNITED STATES PATENTS

| | | |
|---|---|---|
| 3,238,306 | 3/1966 | Bohlmeijer. |
| 3,249,699 | 5/1966 | Mol et al. |
| 3,310,633 | 3/1967 | Schonemeyer. |

WILLIAM C. COOPER, Primary Examiner